(12) United States Patent
Sabri et al.

(10) Patent No.: US 10,131,360 B2
(45) Date of Patent: Nov. 20, 2018

(54) METHODS AND SYSTEMS FOR ESTIMATING ROAD SURFACE FRICTION

(71) Applicant: GM GLOBAL TECHNOLOGY OPERATIONS LLC, Detroit, MI (US)

(72) Inventors: Yadollah Sabri, Sterling Heights, MI (US); Simon E. Zimmerman, Poway, CA (US); Yingmei Si, West Bloomfield, MI (US); Steven T. Schweitzer, Sterling Heights, MI (US); Qingrong Zhao, Madison Heights, MI (US); Qi Zhang, Sterling Heights, MI (US); Nikolai K. Moshchuk, Grosse Pointe, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 15/236,106

(22) Filed: Aug. 12, 2016

(65) Prior Publication Data

US 2018/0043900 A1    Feb. 15, 2018

(51) Int. Cl.
*B60W 40/06* (2012.01)
*B60W 40/068* (2012.01)
*B60W 40/105* (2012.01)
*B60W 40/114* (2012.01)
(Continued)

(52) U.S. Cl.
CPC ........ *B60W 40/068* (2013.01); *B60W 40/105* (2013.01); *B60W 40/114* (2013.01); *B60W 50/14* (2013.01); *G05D 1/0055* (2013.01); *G05D 1/0061* (2013.01); *B60W 2520/10* (2013.01); *B60W 2520/12* (2013.01); *B60W 2520/14* (2013.01); *B60W 2550/148* (2013.01);
(Continued)

(58) Field of Classification Search
CPC ............... B60W 40/068; B60W 30/02; B60W 30/18172; B60W 40/064; B60W 40/101; B60W 2520/10; B60W 2520/14; B60W 2520/18; B60W 2520/20; B60W 2520/125; B62D 6/003; B62D 6/006; B62D 5/008; B62D 15/025; G01N 19/02
USPC ...... 701/41, 42, 80; 180/443, 446, 422; 73/9
See application file for complete search history.

(56) References Cited

U.S. PATENT DOCUMENTS

| | | | |
|---|---|---|---|
| 6,925,371 B2 * | 8/2005 | Yasui | B60T 8/17551 701/41 |
| 9,242,670 B2 * | 1/2016 | Endo | B62D 5/0466 |
| 9,499,172 B2 * | 11/2016 | Urmson | B60W 40/06 |

(Continued)

*Primary Examiner* — Dalena Tran
(74) *Attorney, Agent, or Firm* — Lorenz & Kopf, LLP

(57) ABSTRACT

Methods and systems are provided for determining a road surface friction coefficient and controlling a feature of the vehicle based thereon. In one embodiment, a method includes: receiving signals from an electronic power steering system and an inertial measurement unit; estimating parameters associated with an electronic power steering system model using an iterative optimization method; calculating an electronic power steering system variable using the electronic power steering system model, the estimated parameters and one or more of the received signals; determining whether the calculated electronic power steering system variable satisfies a fitness criterion; and when the calculated electronic power steering system variable does satisfy the fitness criterion, determining a road surface friction coefficient based on at least one of the estimated parameters.

16 Claims, 4 Drawing Sheets

(51) Int. Cl.
*B60W 50/14* (2012.01)
*G05D 1/00* (2006.01)

(52) U.S. Cl.
CPC .......... *B60W 2710/202* (2013.01); *G05D 2201/0213* (2013.01)

(56) References Cited

U.S. PATENT DOCUMENTS

2006/0074541 A1* 4/2006 Ono .............. B60T 8/172
 701/80
2010/0204889 A1* 8/2010 Watanabe .......... B62D 5/0463
 701/42

* cited by examiner

METHODS AND SYSTEMS FOR ESTIMATING ROAD SURFACE FRICTION

TECHNICAL FIELD

The technical field generally relates to estimating road surface friction, and more particularly relates to the use of tire self-aligning torque in estimating road surface friction and controlling a vehicle based thereon.

BACKGROUND

Different road surfaces are characterized by different road surface friction coefficients (μ). For example, icy conditions may have a relatively low μ, while dry asphalt surfaces may have a relatively high μ. The road surface friction coefficient affects vehicle performance by influencing tire grip, for example.

In order to improve vehicle responsiveness to the road surface, vehicle systems attempt to estimate the road surface friction coefficient. One method of estimating the road surface friction coefficient is to calculate the self-aligning torque (SAT) of the vehicle's tires, and estimate μ based on the calculated self-aligning torque (SAT).

Conventional methods estimate a slope estimate for a linear region of self-aligning torque (SAT) as a function of slip angle (α). The slope estimate is then converted to an estimate of the road surface friction co-efficient using a look up table.

However, these methods provide inaccurate detection of low road surface friction coefficient surfaces at lower values of SAT, such as before SAT reaches a maximum value in the linear SAT region as a function of slip angle. The pre-saturation region of SAT versus slip angle corresponds to normal steering and moderate slip angle.

Furthermore, other methods of estimating the road surface friction coefficient based on SAT values rely on detecting the so-called "break point" of SAT, where a pneumatic trail collapses. The SAT break point is only encountered in high steering regions, i.e., in harsh driving maneuvers. These other methods therefore also suffer from the problem of not accurately predicting road surface friction coefficients at low SAT values.

Accordingly, it is desirable to provide improved methods and systems for determining road surface friction coefficients using self-aligning torque. It is further desirable to more accurately determine the road surface coefficients at lower values of self-aligning torque. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for determining a road surface friction coefficient and controlling a feature of the vehicle based thereon. In one embodiment, a method includes: receiving signals from an electronic power steering system and an inertial measurement unit; estimating parameters associated with an electronic power steering system model using an iterative optimization method; calculating an electronic power steering system variable using the electronic power steering system model, the estimated parameters and one or more of the received signals; determining whether the calculated electronic power steering system variable satisfies a fitness criterion; and when the calculated electronic power steering system variable does satisfy the fitness criterion, determining a road surface friction coefficient based on at least one of the estimated parameters.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
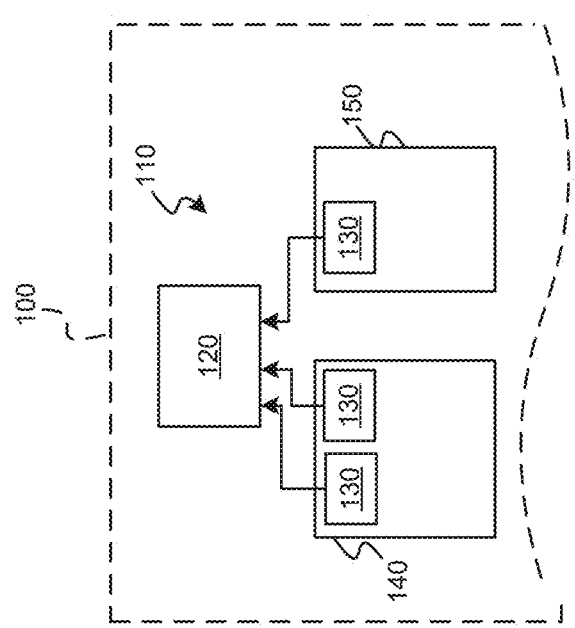
FIG. 1 is a functional block diagram of a vehicle having a road surface friction coefficient determination module in accordance with various embodiments.

With reference to FIG. 1, an exemplary vehicle 100 in part that includes a control system 110 is shown in accordance with exemplary embodiments. As can be appreciated, the vehicle 100 may be any vehicle type that travels over a road surface. Although the figures shown herein depict an example with certain arrangements of elements, additional intervening elements, devices, features, or components may be present in actual embodiments. It should also be understood that FIG. 1 is merely illustrative and may not be drawn to scale.

The control system 110 includes a control module 120 that receives inputs from one or more sensors 130 of the vehicle 100. The sensors 130 sense observable conditions of the vehicle 100 and generate sensor signals based thereon. For example, the sensors 130 may sense conditions of an electric power steering system 140 of the vehicle 100, an inertial measurement unit 150 of the vehicle 100, and/or other systems of the vehicle 100 and generate sensor signals based thereon. In various embodiments, the sensors 130 communicate the signals directly to the control module 120 and/or may communicate the signals to other control modules (not shown) which, in turn, communicate data from the signals to the control module 120 over a communication bus (not shown) or other communication means.

The control module 120 receives the signals and/or the data captured by the sensors and estimates a surface value (correlating with the road surface friction coefficient) based thereon. For example, the control module 120 determines a motor total moment of inertia (I), a friction co-efficient (C), and a self-aligning torque coefficient ($D_f$), according to an iterative optimization method. This iterative method continues until a fitness criterion is satisfied. The final values of inertia (I), a friction co-efficient (C), and/or a self-aligning torque coefficient ($D_f$) can be used to determine the road surface value. The control module 120 then uses the road surface value to control one or more features of the vehicle 100. For example, the control module 120 can determine a wet surface based on the road surface value and generate alerts and/or control the vehicle based on the knowledge of the wet surface. The control module 120 determines an autonomous actuating vehicle braking strategy; communicates the road surface friction coefficient to a wireless communication system for alerting other vehicle drivers of the identified wet surface of low friction; alerts a driver of a potential reduced traction between vehicle tires and the surface as a result of the wet surface; alerts a driver to not use a driver assistance system; and/or provides a notification of the wet surface to a vehicle controller (not shown), and the vehicle controller autonomously modifies a control setting of an automated control feature in response to the notification.

Figure 2:
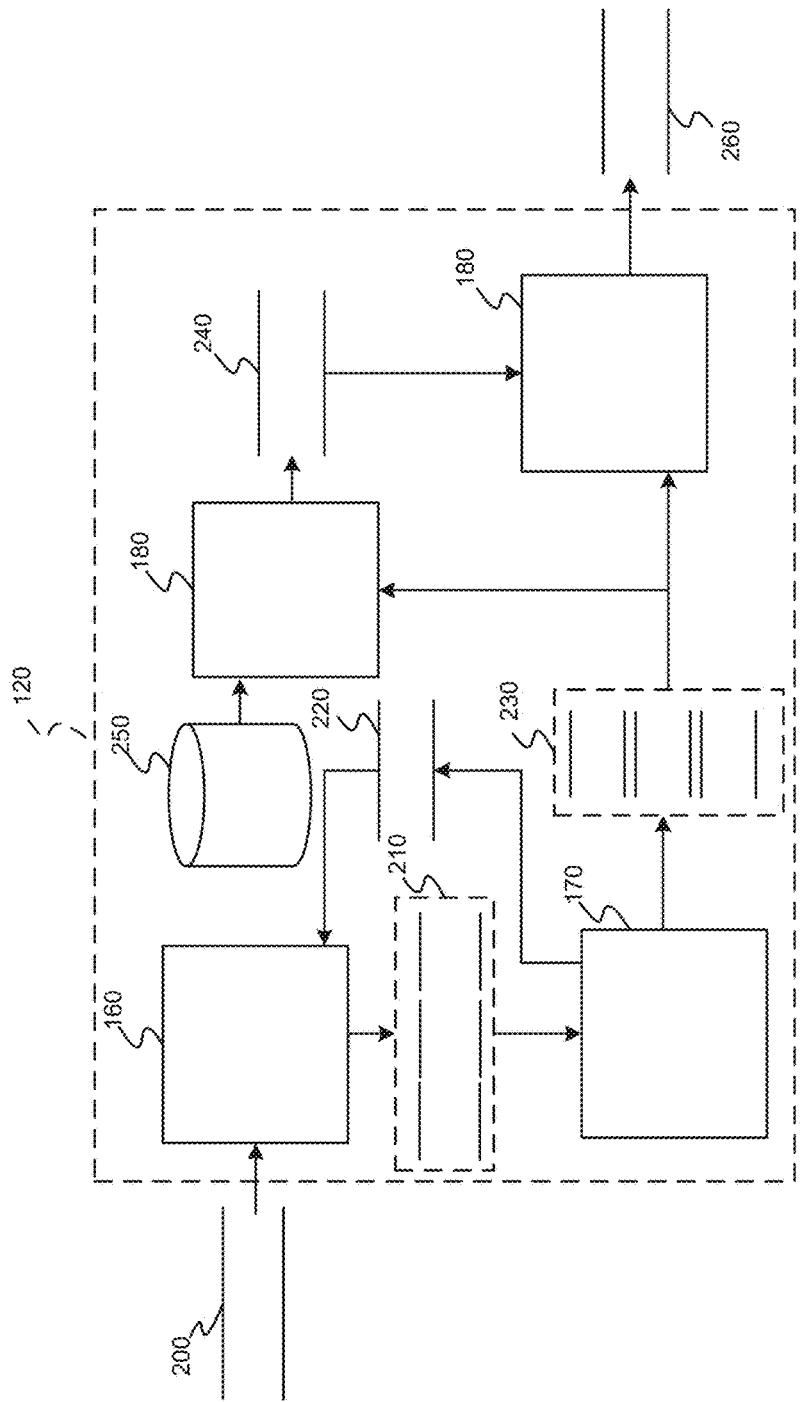
FIG. 2 is a dataflow diagram illustrating a road surface friction coefficient determination module in accordance with various embodiments.

Referring now to FIG. 2 and with continued reference to FIG. 1, a dataflow diagram illustrates the control module 120 in accordance with various exemplary embodiments. As can be appreciated, various exemplary embodiments of the control module 120, according to the present disclosure, may include any number of sub-modules. In various exemplary embodiments, the sub-modules shown in FIG. 2 may be combined and/or further partitioned to similarly estimate road surface information and to control one or more components of the vehicle 100 based thereon. In various embodiments, the control module 120 includes an iterative optimization module 160, a fitness criterion evaluation module 170, a road surface value determination module 180, and at least one feature control module 190.

The iterative optimization module 160 receives as input sensed signals 200 from the EPS and/or the IMU. For example, the inputs 200 can include, but are not limited to a torsion bar angle and a total EPS delivered torque that may be sensed directly from the EPS system 140 or determined indirectly from other sensed values, and a yaw rate, a lateral speed, and a longitudinal speed that may be sensed directly from the vehicle IMU 150 or determined indirectly from other sensed values.

The iterative optimization module 160 computes a number of candidate solutions 210 of [I, C, $D_f$] based on an iterative optimization method. The iterative optimization method can include, for example, but is not limited to a particle swarm optimization (PSO) method, a Recursive Least Square Estimation (RLS), and a Kalman Filter (KF). As will be discussed in more detail below, a PSO may use a number of candidate solutions 210 of [I, C, $D_f$] that each have an initial position and velocity in a solution search space. These candidate solutions 210 may be generated randomly or algorithmically. The candidate solution 210 of [I, C, $D_f$] that best fits the measured $T_{EPS}$ when combined with the measured parameters of torsion bar angle position, speed and acceleration, yaw rate, lateral speed and longitudinal speed, and measured $T_{EPS}$, is then selected.

All of the candidate solutions' positions and velocities are then updated based on the selected candidate solution. This updating of the candidate solutions may involve changing all of the candidate solutions' velocities so as to be directed toward the selected candidate solution's position. After the updating, a different candidate solution may best fit the measured $T_{EPS}$. This different candidate solution is then selected, and the remaining candidate solutions are then updated based on the new selected candidate solution.

The fitness criterion evaluation module 170 receives as input the candidate solutions 210 of [I, C, $D_f$]. The fitness criterion evaluation module 170 evaluates fitness criterion and selectively stops the iterative process when the fitness criterion is satisfied (e.g., via a fitness status flag). The fitness criterion may be a comparison of the candidate solutions 210 with a measured $T_{EPS}$ such that the candidate solutions 210 of I, C and $D_f$ give a predicted $T_{EPS}$ that is accurate to within a certain threshold. Alternatively, the fitness criterion may be that a predetermined number of iterations has been performed using the initial candidate solutions 210. The fitness criterion evaluation module 170 than provides final candidate solutions 230 of [I, C, $D_f$], after the iterations have stopped.

The road surface value determination module 180 receives as input the final candidate solutions 230. The road surface value determination module 180 determines a road surface friction coefficient GO 240 based on a relationship between $D_f$ and µ. For example, the road surface value determination module 180 looks up the value of µ using $D_f$ from a database 250 that stores the relationship as will be discussed in more detail below.

The feature control module 190 receives the determined road surface friction coefficient value 240 and or the determined final candidate solutions 230 of [I, C, $D_f$]. The feature control module 190 generates one or more control signals 260 to control one or more features of the vehicle 100 based on the road surface friction coefficient value 240 and/or the final candidate solutions 230 of [I, C, $D_f$].

Figure 3:
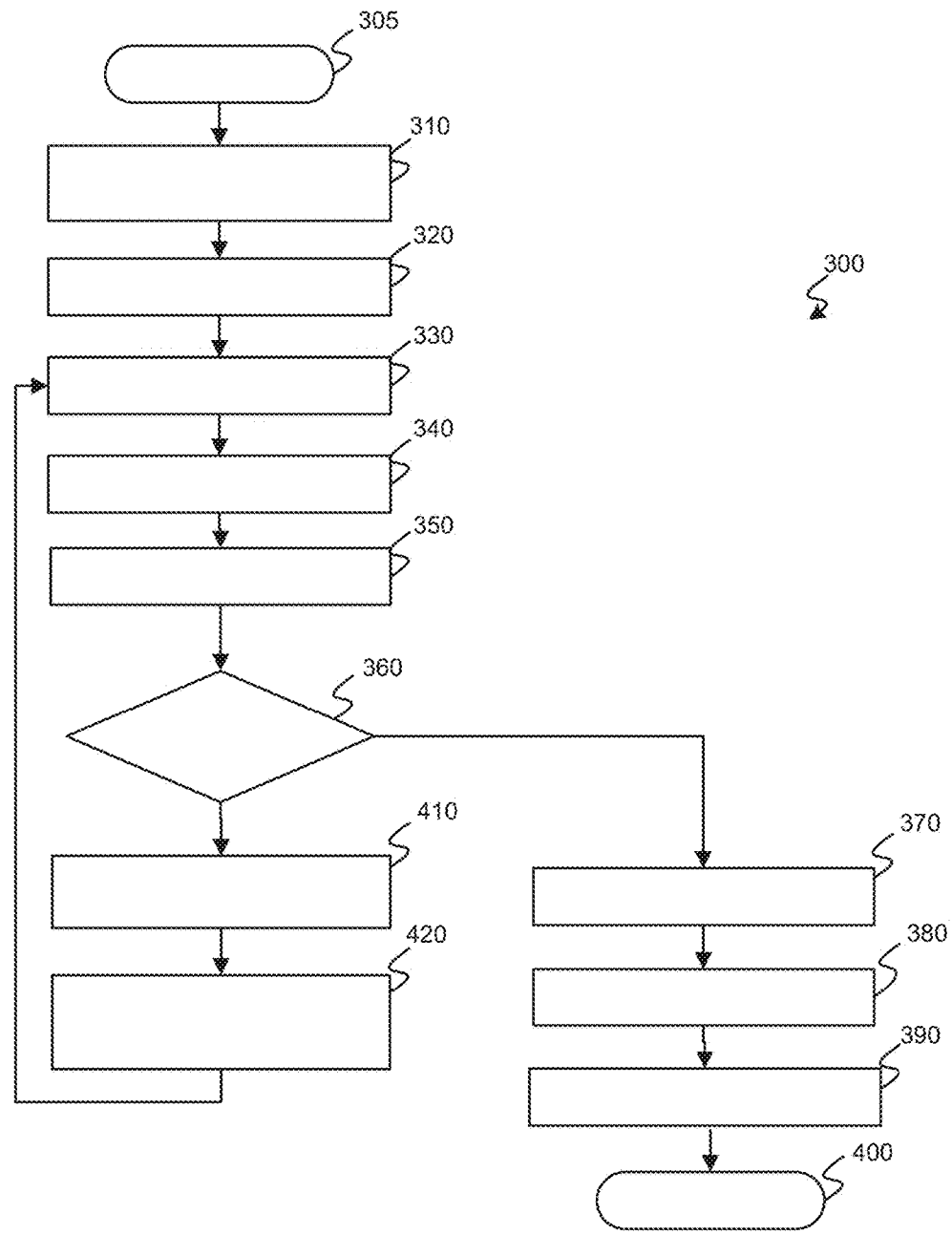
FIG. 3 is a flowchart illustrating a iterative processing method in accordance with various embodiments.

With reference now to FIG. 3, and with continued reference to FIGS. 1-2, flowcharts are shown of methods 300 for determining road friction coefficient and controlling a vehicle based thereon, in accordance with various embodiments. The methods 300 can be implemented in connection with the vehicle 100 of FIG. 1 and can be performed by the control module 120 of FIG. 1, in accordance with various exemplary embodiments. As can be appreciated in light of the disclosure, the order of operation within the method is not limited to the sequential execution as illustrated in FIG. 3, but may be performed in one or more varying orders as applicable and in accordance with the present disclosure. As can further be appreciated, the methods of FIG. 3 may be scheduled to run at predetermined time intervals during operation of the vehicle 100 and/or may be scheduled to run based on predetermined events.

Figure 4:
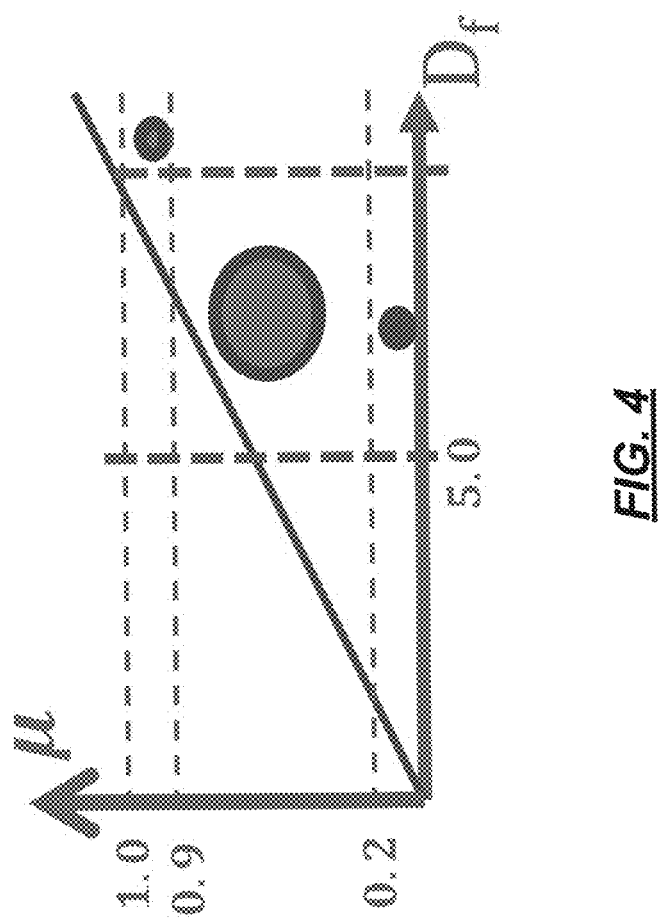
FIG. 4 is a graph illustrating a database of relationships in accordance with various embodiments.

FIG. 4 illustrates a method 300 of particle swarm optimization in accordance with various embodiments. The method may begin at 305. At 310, signals received from the IMU 150 and EPS 140 are read. These received signals may comprise parameters associated with the torsion bar angle, angular velocity and angular acceleration, the vehicle lateral and longitudinal speeds, the vehicle yaw rate, and the total EPS delivered torque. These parameters are then used to define the solution constraints. Specifically, these parameters are used to define the optimal values of I, C and $D_f$ that will be estimated by the optimization method.

At 320, a number of candidate solutions are then generated. These candidate solutions may be randomly generated. Each candidate solution may be represented as a particle in a 3D solution space, with each axis of the solution space corresponding to a value of I, C and $D_f$, respectively. The particle positions and velocities may be randomized, so that each particle has a position and a velocity in the solution space.

At 330, the particle representing the best candidate solution is chosen. This particle is chosen by selecting the particle position in the 3D solution space with the values of I, C and $D_f$ that, taken in combination with the received signals, gives a solution closest to the measured value to $T_{EPS}$. This particle's position is stored.

At 340, the local best solution for each particle is determined. At the first iteration, the local best solution will correspond to the particle's initial position. However, after multiple iterations, the particle will have several different positions, corresponding to several potential solutions of I, C and $D_f$. Each of these solutions is stored, and the position corresponding to the most accurate solution of I, C, and $D_f$ will be selected as the local best solution for a particular particle.

At 350, the fitness criteria are applied. As detailed above, the fitness criteria may be an iteration count, where the total number of iterations performed so far is compared to a predetermined iteration count. Additionally or alternatively, the fitness criteria may be an accuracy criteria, where the candidate solution of $T_{EPS}$ calculated using the candidate solutions of I, C, and $D_f$ is compared with the measured $T_{EPS}$. If the candidate solution of $T_{EPS}$ is accurate to the measured $T_{EPS}$ to within a predetermined allowable error margin, the fitness criteria may be deemed to be satisfied.

At 360, a decision is performed based on the result of the fitness criteria. If the fitness criteria is satisfied (the "Yes" path) at 360, then the solution of I, C and $D_f$ is stored and output at 370. The value of $D_f$ is then used to determine the road surface friction coefficient at 380, as detailed below and one or more of the results are used to control a feature of the vehicle 100 at 390. Thereafter, the method may end at 400.

If the fitness criteria is not satisfied (the "No" path) at 360, the iteration count is updated at 410. For example, if the fitness criteria is not satisfied with the initial particle positions, the iteration count will be increased from one to two at this step, and so on for every iteration in which the fitness criteria is not satisfied. Thereafter, at 420, each particle's velocity is updated on the basis of the global best solution and the local best solution. The equations used to update each particle's velocity may be expressed as:

$$\text{Delta}[C,D_f,I]_i(t) = \kappa\{\text{Delta}[C,D_f,I]_i(t-1) + C_2\text{rand}_2 \cdot (p_g - [C,D_f,I]_i(t-1))\} \quad (1)$$

$$[C,D_f,I]_i(t) = [C,D_f,I]_i(t-1) + \text{Delta}[C,D_f,I]_i(t), \text{ and} \quad (2)$$

$$\text{Fitness} = ISE(T\_Mot - T\_Model). \quad (3)$$

(3) where Delta [C, $D_f$, I] is the change in position of a single candidate solution over a predetermined time period t, and where $P_1$ is the local best solution for a particular particle and where $P_s$ is the global best solution out of all of the particles. As is also shown above, the fitness criteria applied at 350 may be a comparison of $T_{EPS}$ model with $T_{EPS}$ measured from the motor vehicle by the EPS system.

After updating the particle's velocity, the PSO allows the particle's position in the solution space to progress over a predetermined amount of time, such that each particle acquires a new position in the solution space.

After a predetermined amount of time t has elapsed, the particle's positions are measured, and the candidate solutions represented by the particles' positions in the solution space are analyzed to determine the best global solution. Best local positions for each particle are also determined. The method then iterates until the fitness criteria is satisfied at 360. The candidate solution represented by each particle position improves for each iteration.

After the particle swarm optimization has been performed and the fitness criteria are satisfied for a particular iteration, the estimated value of $D_f$ is then used to estimate the road surface friction coefficient (μ).

In order to estimate μ on the basis of $D_f$, the processor module compares the estimated value of $D_f$ with predetermined values of $D_f$ stored on a database. The database is established based on estimated $D_f$ values for different vehicle types on a variety of different surfaces.

A graph showing the relationship between $D_f$ and μ predicted by the database is shown in FIG. 4. As can be seen in FIG. 4, a particular value of $D_f$ may give rise to different values of μ, depending on the other parameters used to determine μ by the database.

For example, as can be seen in FIG. 4, a value of $D_f$ of 7-8 may give rise to a value of μ of less than 0.2, or above 0.5. The circles in FIG. 4 show common values of μ chosen by the database for values of $D_f$ selected by the PSO method. The different values of μ selected by the database are a consequence of different vehicle parameters used by the database for each determination.

In various embodiments, the database may be algorithmically trained to better match the estimated $D_f$ value to the true road surface friction coefficient. For example, the database may be trained offline to select values of μ based on different input values of $D_f$, taking into account different vehicle characteristics such as pneumatic trail and mechanical trail. Pneumatic trail may be estimated for a specific vehicle based on parameters such as longitudinal speed and tire dimensions, whilst mechanical trail can be estimated with the specific vehicle dimensions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
 receiving signals from an electric power steering system and an inertial measurement unit;
 iteratively estimating parameters including a moment of inertia, a friction co-efficient, and a self-aligning torque coefficient associated with an electric power steering system model using a particle swarm optimization method and the signals;
 determining whether the parameters satisfy a fitness criterion; and
 when the estimated parameters satisfy the fitness criterion, determining a road surface friction coefficient based on at least one of the estimated parameters.

2. The method of claim 1, further comprising detecting a slip angle and determining the road surface friction coefficient when the slip angle is less than a pre-determined value.

3. The method of claim 1, wherein the estimated parameter chosen to base the determination of the road surface friction coefficient on is the self-aligning torque coefficient.

4. The method of claim 1, further comprising calculating an electronic power steering system torque value using the electronic power steering system model, the estimated parameters, and one or more of the received signals; and comparing the calculated electric power steering system torque value with a measured torque value to determine the fitness criterion.

5. The method of claim 1, determining an iteration count and wherein the fitness criterion is based on the iteration count.

6. The method of claim 1, wherein the signals from the electric power steering system comprise a torsion bar angle and a total electric power steering delivered torque.

7. The method of claim 1, wherein the signals from the inertial measurement unit comprise a yaw rate, a lateral speed, and a longitudinal speed.

8. The method of claim 1, further comprising determining that the road surface friction coefficient indicates a wet surface and at least one of:
 determining an autonomous actuating vehicle braking strategy;
 communicating the road surface friction coefficient to a wireless communication system for alerting other vehicle drivers of the identified wet surface of low friction;
 alerting a driver of a potential reduced traction between vehicle tires and the surface as a result of the wet surface;
 alerting a driver to not use a driver assistance system; and
 providing a notification of the wet surface to a vehicle controller, and the vehicle controller autonomously modifying a control setting of an automated control feature in response to the notification.

9. A system, comprising:
 a non-transitory computer readable medium, comprising:
  a first module configured to receive sensor signals from an electric power steering system and an inertial measurement unit, and to iteratively estimate parameters including a moment of inertia, a friction co-efficient, and a self-aligning torque coefficient associated with an electric power steering system model using a particle swarm optimization method;
  a third module configured to determine whether the parameters satisfy a fitness criterion, and when the parameters do satisfy the fitness criterion, the third module is further configured to determine a road surface friction coefficient based on at least one of the estimated parameters; and
  a fourth module configured to control one or more vehicle features based on the road surface friction coefficient.

10. The system of claim 9, further comprising a slip angle sensor configured to detect a slip angle, wherein the third module is configured to determine the road surface friction coefficient when the slip angle is less than a pre-determined value.

11. The system of claim 9, wherein the estimated value chosen to base the determination of the road surface friction coefficient on is the self-aligning torque coefficient.

12. The system of claim 9, further comprising a second module configured to calculate an electronic power steering system torque value using the electronic power steering system model, the estimated values, and one or more of the received signals; and wherein the third module is configured to compare the calculated electric power steering system torque value with a measured torque value to determine the fitness criterion.

13. The system of claim 9, wherein the third module is further configured to determine an iteration count and wherein the fitness criterion is based on the iteration count.

14. The system of claim 9, wherein the third module determines the road surface coefficient by selecting the road surface coefficient from a trained database.

15. The system of claim 9, wherein the signals from the electric power steering system comprise a torsion bar angle and a total electric power steering delivered torque.

16. The system of claim 9, wherein the signals from the inertial measurement unit comprise a yaw rate, a lateral speed, and a longitudinal speed.

* * * * *